(12) United States Patent
Wilczek

(10) Patent No.: US 10,748,223 B2
(45) Date of Patent: Aug. 18, 2020

(54) PERSONAL HEALTH AND SAFETY CHECKS VIA GEOLOCATION EXPENSING

(71) Applicant: Coupa Software Incorporated, San Mateo, CA (US)

(72) Inventor: Donna Wilczek, Sonoma, CA (US)

(73) Assignee: COUPA SOFTWARE INCORPORATED, San Mateo, CA (US)

( * ) Notice: Subject to any disclaimer, the term of this patent is extended or adjusted under 35 U.S.C. 154(b) by 349 days.

(21) Appl. No.: 15/699,969

(22) Filed: Sep. 8, 2017

(65) Prior Publication Data

US 2019/0080424 A1    Mar. 14, 2019

(51) Int. Cl.
*G06Q 50/14* (2012.01)
*G06Q 50/26* (2012.01)
(Continued)

(52) U.S. Cl.
CPC ............ *G06Q 50/14* (2013.01); *G06F 16/29* (2019.01); *G06F 16/9038* (2019.01);
(Continued)

(58) Field of Classification Search
CPC ...... G06Q 50/14; G06Q 40/12; G06Q 50/265; G06F 16/29; G06F 16/9038; G06F 16/951
See application file for complete search history.

(56) References Cited

U.S. PATENT DOCUMENTS 6,826,473 B1 * 11/2004 Burch ................ G01C 21/20
                                                    342/357.46
7,908,191 B1 *  3/2011 Dinamani ............ G01C 22/02
                                                    340/988
(Continued)

OTHER PUBLICATIONS

Hong, Lee Theng. "Android Mobile Application—Expenses with Geo-Location Tracking". Bachelors Thesis, University Tunku Abdul Rahman. May 2015 (Year: 2015).*

*Primary Examiner* — Nathan A Mitchell
(74) *Attorney, Agent, or Firm* — Hickman Palermo Becker Bingham LLP

(57) ABSTRACT

In an embodiment, a computer-implemented method comprises receiving, from a plurality of different mobile computing devices that are located in different distributed geographic locations, a plurality of different expense report line item records, the expense report line item records generated by instances of expense tracking application programs hosted at the mobile computing devices, each of the expense report line item records comprising at least an account identification value and a geo-location value, the geo-location value indicating a then-current geographical location of a particular mobile computing device; digitally storing the plurality of different expense report line item records in a digital data repository; receiving, from a client computer, a request to report one or more of: all account identification values that are within a specified geographic region; or the last recorded locations of a particular account identification value; generating and submitting a database query to the
(Continued)

digital data repository based on the request, and receiving a result set of particular account identification values or particular last recorded location values; generating and causing displaying, at the client computer, a digital data display that shows the particular account identification values or particular last recorded location values.

20 Claims, 7 Drawing Sheets

(51) Int. Cl.
      *G06Q 40/00*       (2012.01)
      *G06F 16/951*     (2019.01)
      *G06F 16/9038*   (2019.01)
      *G06F 16/29*       (2019.01)

(52) U.S. Cl.
     CPC .......... *G06F 16/951* (2019.01); *G06Q 40/12* (2013.12); *G06Q 50/265* (2013.01)

(56) References Cited

U.S. PATENT DOCUMENTS

| | | | |
|---|---|---|---|
| 9,245,261 B2 * | 1/2016 | Anand | G06Q 20/045 |
| 2005/0289025 A1 * | 12/2005 | Fredericks | G06Q 10/10 |
| | | | 705/30 |
| 2009/0171939 A1 * | 7/2009 | Athsani | G06F 16/29 |
| 2012/0084117 A1 * | 4/2012 | Tavares | G06Q 30/00 |
| | | | 705/7.29 |
| 2012/0185368 A1 * | 7/2012 | Schloter | G06Q 40/12 |
| | | | 705/30 |
| 2012/0259748 A1 * | 10/2012 | Young | G06Q 40/02 |
| | | | 705/34 |
| 2014/0108210 A1 * | 4/2014 | Chelst | G06Q 20/023 |
| | | | 705/30 |
| 2014/0188673 A1 * | 7/2014 | Graham | G06Q 40/10 |
| | | | 705/30 |
| 2014/0324644 A1 * | 10/2014 | Shoup | G06Q 40/12 |
| | | | 705/30 |
| 2015/0142491 A1 * | 5/2015 | Webb | G06Q 10/063114 |
| | | | 705/7.15 |
| 2016/0063457 A1 * | 3/2016 | Liu | G06Q 20/3224 |
| | | | 705/39 |
| 2016/0321659 A1 * | 11/2016 | Annesley-DeWinter | G06Q 40/12 |
| 2017/0200234 A1 * | 7/2017 | Morse | G06Q 40/12 |
| 2018/0018338 A1 * | 1/2018 | Guzman | G06F 17/248 |

* cited by examiner

FIG. 2

Expense Report Line Items

| User ID | Expense Date | Latitude | Longitude | Expense Category | Expense Amount | Description or Other Data |
|---|---|---|---|---|---|---|
| 18630 | 01/16/17 | 41.5387° N | 75.9466° W | Travel | $400.00 | Gas |
| 95050 | 01/18/17 | 37.3541° N | 121.9552° W | Food | $12.59 | Coffee |
| 18844 | 11/24/16 | 41.3851° N | 2.1734° E | Food | $35.95 | Dinner |
| 96527 | 11/20/16 | 41.6707° N | 75.9115° W | Travel | $239.00 | Air for tires |

PERSONAL HEALTH AND SAFETY CHECKS VIA GEOLOCATION EXPENSING

FIELD OF THE DISCLOSURE

The technical fields of the present disclosure include processing of geo-location data from mobile computing devices, automatic generation of digital notification messages based upon programmed rules and constraints, automatic generation of digital maps based on mobile device locations and computer-implemented remote data collection and reporting systems.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Businesses are becoming increasingly more responsible for maintaining workplace safety for employees, which includes employees who are traveling for business purposes. In the event of a security incident, under contemporary notions of responsibility, a business may be responsible for maintaining workplace safety for traveling employees or at least identifying or reporting information about them. However, this responsibility becomes increasingly difficult to maintain with persons traversing the globe and little ability to pinpoint where travelers are at any given time.

In the event of a security incident at a location, business entities may desire to send safety alerts or check-in with employees who are traveling in relative proximity to the security incident to confirm their safety. However, with limited information available regarding the whereabouts of travelers, sending alerts and checking in with travelers who are within range of a security incident can become a burdensome process. Typical solutions have required traveling persons to self-report their location and status. Examples include employees phoning home, or the Facebook "marked safe" feature. But even if employees have notified a home office where they are at some point in time, the process of individually contacting each employee business traveler to notify them of a security incident or confirm their safety can be extremely burdensome on the employer or too slow to be useful.

Business entities now employ computer-implemented remote data collection and reporting systems to enable mobile computing devices in remote locations to report data to a distant server computer that hosts application software. Examples include computer-based expense tracking systems to help employees keep track of expenses while they are engaging in business travel.

Based on the foregoing, there is a need to facilitate more accurate information about locations of persons who are traveling at a specific time.

BRIEF DESCRIPTION OF THE DRAWINGS

FIG. 2 illustrates an example expense report line item table that may be programmed or configured as part of a database or other data repository.

DETAILED DESCRIPTION

Figure 1:
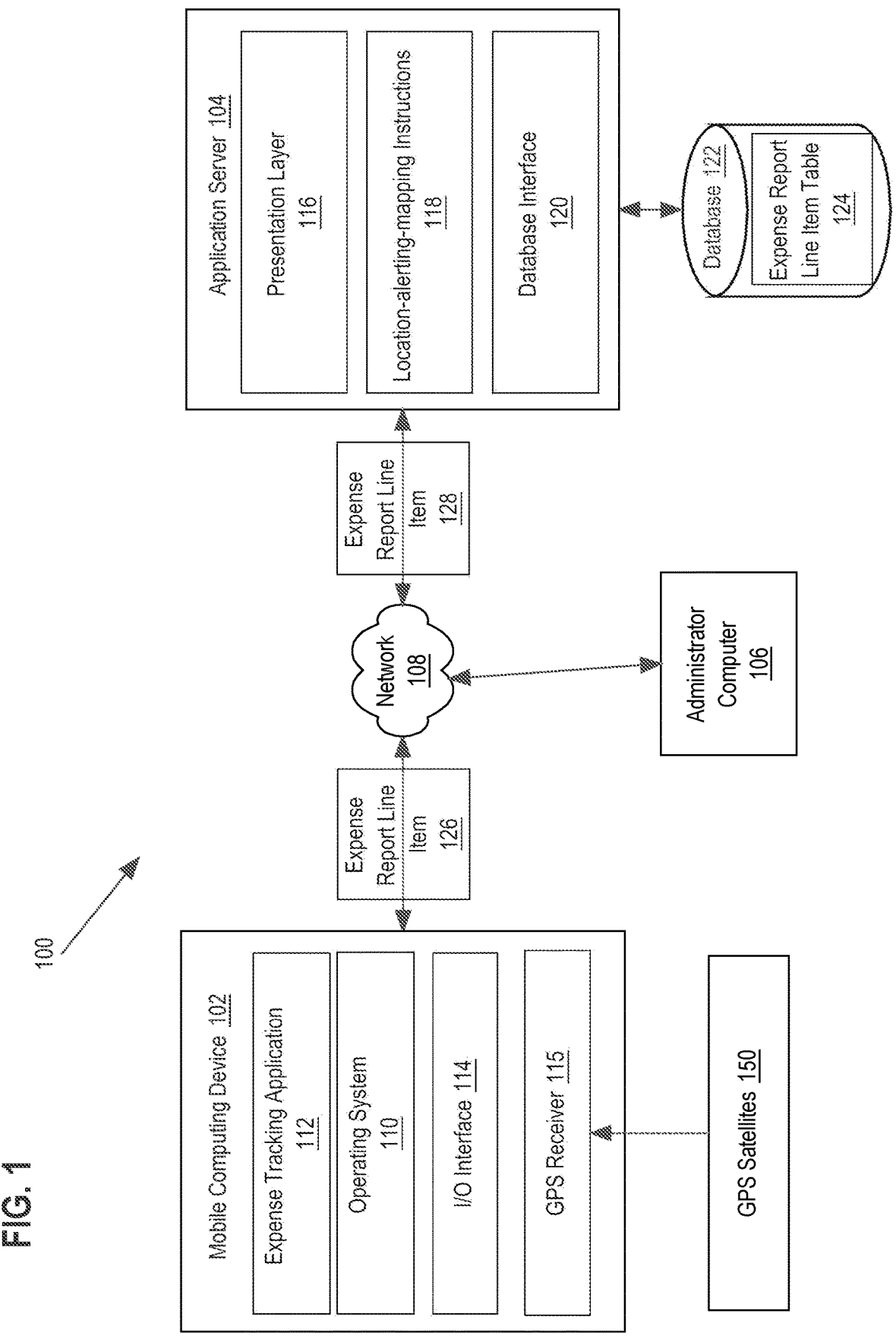
FIG. 1 illustrates an example networked computer system in which various embodiments may be practiced.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Certain embodiments are described in the content of an application executing on a mobile computing device that works with a server computer. However, it is understood that an application is only executing code which may occur solely or partially on the mobile computing device. For example, the same principles as discussed in this application would be possible using a standalone computer, without access to a server computer.

Embodiments are described in sections according to the following outline:

1.0 GENERAL OVERVIEW
2.0 EXAMPLE NETWORKED COMPUTER SYSTEM
3.0 EXAMPLE ALGORITHMS AND METHODS
4.0 BENEFITS
5.0 HARDWARE OVERVIEW
6.0 OTHER ASPECTS OF DISCLOSURE 1.0 General Overview Techniques and a system are provided for issuing personal health and safety checks via geolocation expensing. A computer-based expense tracking system can be programmed to recognize specific scenarios of when a business traveler is likely to engage in a financial transaction that will result in a business expense. When one of these scenarios is detected, a business traveler may be prompted via their mobile device to record an expense. For example, expense tracking systems available today can prompt a user to enter a lunch expense when the local time is 3:00 PM and no meal expense line items have been entered. Using these techniques, the geolocation of the traveler at the time the expense was entered can be recorded.

In one embodiment, a computer-implemented method comprises receiving, from a plurality of different mobile computing devices that are located in different distributed geographic locations, a plurality of different expense report line item records, the expense report line item records generated by instances of expense tracking application programs hosted at the mobile computing devices, each of the expense report line item records comprising at least an account identification value and a geo-location value, the geo-location value indicating a then-current geographical location of a particular mobile computing device; digitally storing the plurality of different expense report line item records in a digital data repository; receiving, from a client computer, a request to report one or more of: all account identification values that are within a specified geographic region; or the last recorded locations of a particular account identification value; generating and submitting a database query to the digital data repository based on the request, and receiving a result set of particular account identification values or particular last recorded location values; generating and causing displaying, at the client computer, a digital data display that shows the particular account identification values or particular last recorded location values. Other features, aspects and embodiments will become apparent from the disclosure as a whole including the drawings and claims.

2.0 Example Networked Computer System

FIG. 1 is a block diagram of an example computer network system in which various embodiments may be practiced. FIG. 1 is shown in simplified, schematic format for purposes of illustrating a clear example and other embodiments may include other elements.

In an embodiment, a computer network system 100 comprises a mobile computing device 102, an application server 104, and an administrator computer 106, which are communicatively coupled directly or indirectly via network 108. These elements are shown to illustrate a clear example of an operating environment for the computer-implemented techniques that are claimed in this disclosure, but an implementation of the claims may not require all such elements.

The mobile computing device 102 may comprise a laptop computer, tablet computer, smartphone, or any other type of mobile computing device that allows execution of applications. Typically, the mobile computing device 102 executes an operating system 110, and hosts expense tracking application 112 as one or more applications or apps, services or other executables. The operating system 110 and expense tracking application 112 receive input from a user and send output to a user via an I/O interface 114.

The expense tracking application 112 may be downloaded from an application store accessible to the mobile computing device 102 or from a host computer. The mobile computing device 102 is portable so that it can be moved or carried while continually providing information over network 108 to the application server 104 and administrator computer 106 using wireless telecommunication such as cellular radiotelephone communication or wireless packet networking such as Wi-Fi.

The operating system 110 may include components that include one or more methods for determining location of the mobile computing device 102 at any given time. Some examples of these methods include using triangulation using cellular radiotelephone tower information, receiving coordinates from a global positioning system (GPS) antenna, detecting a Bluetooth beacon, detecting a Near Field Communication tag, or any combination of the foregoing.

In one embodiment, mobile computing device 102 further comprises a GPS receiver 115 that can receive GPS radiofrequency signals from a plurality of earth orbiting GPS satellites 150 and transform the signals, via triangulation algorithms programmed as part of a location service of the operating system 110, into coordinate values specifying a geographic location, typically as a latitude-longitude value pair. The computer network system 100 may not need to access the underlying hardware of the mobile computing device 102 to retrieve this information. For example, the computer network system 100 may implement various features provided in an API of an operating system executing on the mobile computing device 102 to retrieve the location information. The operating system 110 may interact with the expense tracking application 112 to supply data and service requests for location data.

The expense tracking application 112 includes programming logic to generate expense report line items 126, 128. An expense report line item 126, 128 is an electronic digitally stored record of a transaction, typically involving a purchase of goods or services by a person who owns, operates or uses the mobile computing device 102. An expense report line item 126, 128, in this disclosure, refers to digital data items or records that are stored in computer memory or computer storage, and is not intended to encompass abstract concepts.

FIG. 2 illustrates an example expense report line item table that may be programmed or configured as part of a database or other data repository. In the example of FIG. 2, an expense report line item table 200 comprises a plurality of rows 202 each representing a line item of a future expense report that an employee may submit for reimbursement. Each row 202 may include columns 204 of digital data representing details of the expense associated with a line item such as: date of the expense, location data associated with the expense, user identification, category of the expense, amount of the expense, description of the expense, and any other data associated with the expense. The expense may be in the form of an email, a captured image of a paper document such as a check or receipt, a record of a charge made to an account, or a record that is generated in a mobile application program.

In operation, as further described in other sections, the expense reporting application 112 is programmed to obtain from input, or automatically generate, specific data values for columns of a row representing an expense line item. For example, the user identifier may be digitally stored in a configuration file on the mobile computing device 102 or obtained from the application server 104 in response to a login operation in which a user of the mobile device provides a username, password or other credentials. The expense date may be obtained automatically from the system clock by issuing a programmatic API call to retrieve the current date. The latitude and longitude values, corresponding to a location of the mobile computing device 102 at the time an expense record is created, may be obtained via an API call to the operating system or a location service. The expense category may be obtained from input or inferred based upon the expense reporting application 112 calling a service of the application server 104, providing the latitude and longitude values, and receiving back a category based upon the application server querying a map service or location database to obtain metadata about a restaurant, business or other institution that is associated with the latitude and longitude values. The expense amount may be obtained from input at the device or from a payment application if an electronic payment service was used to pay for the expense item. The description data may be obtained from input, or in the same way as the category value, or from an e-receipt that is obtained via a call to the payment service.

The particular metadata shown in FIG. 2 is provided solely to illustrate one clear example. Other embodiments may use other table schemas, columns, metadata values or other data storage arrangements to represent expense items.

The mobile computing device 102 may transmit the expense report line items 126, 128 via a network 108 to the application server 104. The application server 104 may include instructions that are programmed to supply and receive information to and from the expense tracking application 112 on the mobile computing device 102. For example, in one embodiment, the application server 104 may comprise programmed instructions that are organized as a presentation layer 116, location-alerting-mapping instructions 118, and a database interface 120.

The presentation layer 116 may be programmed or configured for generating electronic pages, alerts, notifications, or application protocol messages to output to mobile devices. For example, the presentation layer 116 may be programmed to generate dynamic web pages that implement the application as a software-as-a-service (SaaS) application that the mobile computing device 102 accesses using a mobile web browser hosted at the mobile computing device. The location-alerting-mapping instructions 118 may be programmed or configured for converting specified geographic regions into ranges of geographic coordinate values that represent the specified geographic regions, and for implementing aspects of the flow diagrams that are further described herein.

The application server 104 may also be coupled to a database of which the application server 104 may access via the database interface 120. The application server 104 may store data such as the expense report line items 126, 128 in the database 122 inside the expense report line item table 124, or in the format of FIG. 2.

The administrator computer 106 is a laptop, desktop computer, or mobile device associated with an administrator. An administrator is a business owner, employee, or contractor who is authorized to make requests for information via the computer network system 100 on behalf of a business entity.

The administrator computer 106 may issue requests for information to the application server 104. For example, the administrator computer 106 may request a list of account identification values that are associated with mobile computing devices that are within a specified geographic region, or, a request to report the last n recorded locations of a particular account identification value. The application server may service the requests by using the location-alerting-mapping instructions 118 to translate administrator specified locations into ranges of geographic coordinates and compare the translated locations to the geographic coordinates from the expense report line items stored in the expense report line item table 124 inside the database 122.

The application server 104 may generate and transmit alerts and notifications to the mobile computing device 102 via the presentation layer 116. Alerts received by the mobile computing device 102 may cause additional notification types to be delivered to a user other than a visual indication via the I/O interface 114. For example, audio (e.g., a ring, buzz, tone, or other audible alert) or tactile (e.g., long vibration, short vibration, vibration pattern) notification types may occur at the mobile computing device 102 in conjunction with an alert.

Network 108 may be implemented by any medium or mechanism that provides for the exchange of data between the various elements of FIG. 1. Examples of network 108 include, without limitation, a cellular network, communicatively coupled with a data connection to the mobile computing device 101 over a cellular antenna, one or more Local Area Networks (LANs), one or more Wide Area Networks (WANs), one or more Ethernets or the Internet, or one or more terrestrial, satellite or wireless links, or a combination thereof. For purposes of illustrating a clear example, network 108 is shown as a single element but in practice, network 108 may comprise one or more local area networks, wide area networks, and/or internetworks. The various elements of FIG. 1 may also have direct (wired or wireless) communications links, depending upon a particular implementation.

3.0 Method Overview

Figure 3:
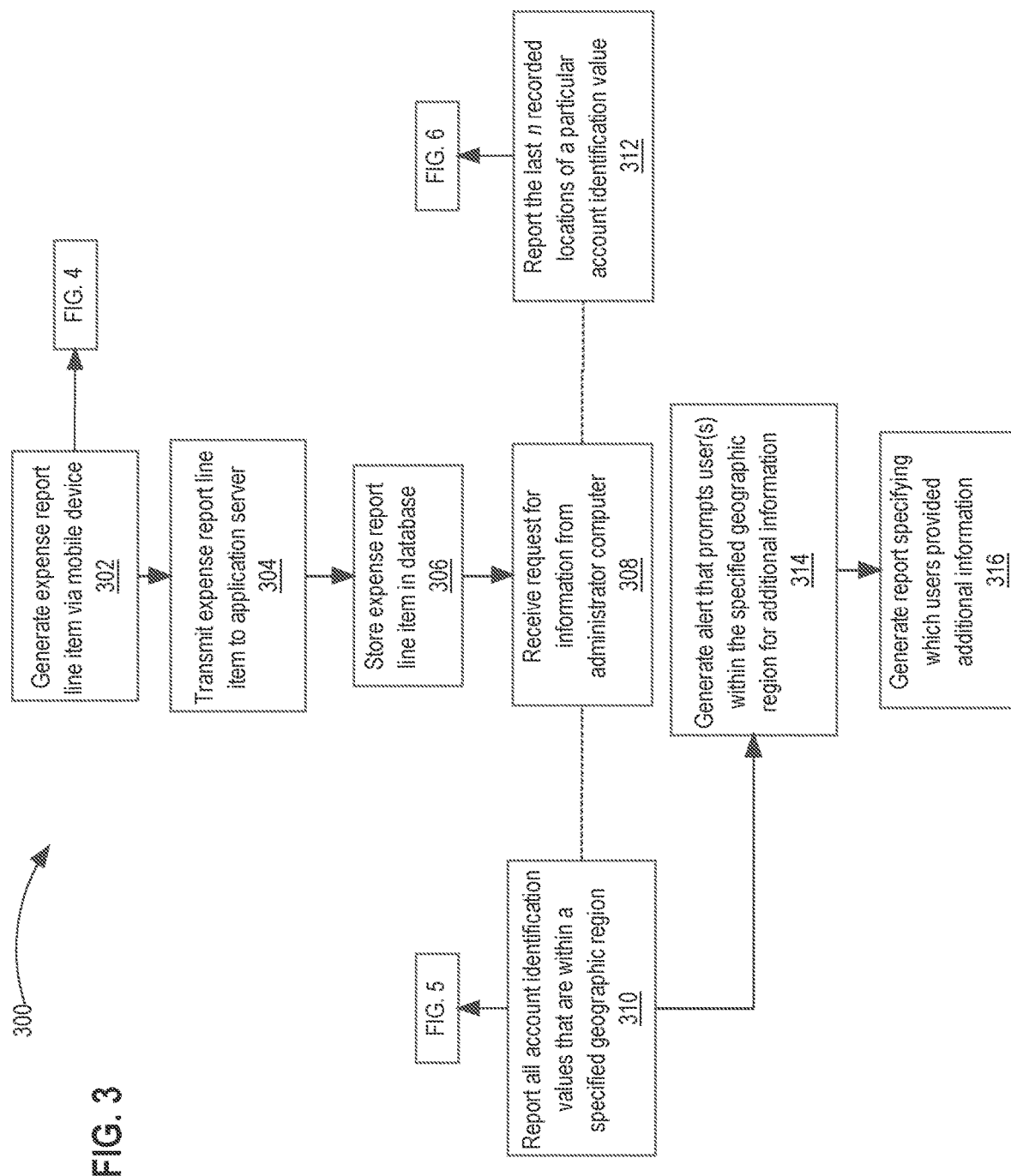
FIG. 3 illustrates an example algorithm or method of issuing employee health and safety checks via geolocation expensing, according to various embodiments.

FIG. 3 is a flowchart of an example computer-implemented method of generating notifications based upon geolocation data obtained via an expensing application, according to various embodiments. FIG. 3 and each other flow diagram herein illustrates an algorithm or plan that may be used as a basis for programming one or more of the functional modules of FIG. 1 that relate to the functions that are illustrated in the diagram, using a programming development environment or programming language that is deemed suitable for the task. Thus, FIG. 3 and each other flow diagram herein are intended as an illustration at the functional level at which skilled persons, in the art to which this disclosure pertains, communicate with one another to describe and implement algorithms using programming. The flow diagrams are not intended to illustrate every instruction, method object or sub step that would be needed to program every aspect of a working program, but are provided at the high, functional level of illustration that is normally used at the high level of skill in this art to communicate the basis of developing working programs. For purposes of illustrating a clear example, FIG. 3 and other flow diagrams are discussed in the context of FIG. 1, FIG. 2, but the algorithms of FIG. 3 and the other flow diagrams also can be implemented in other contexts.

In step 302, an expense report line item is generated using a mobile computing device. For example, the mobile computing device 102 generates expense report line items. An example of generation of expense report line items by the mobile computing device 102 is illustrated in detail by flow 400 of FIG. 4.

Figure 4:
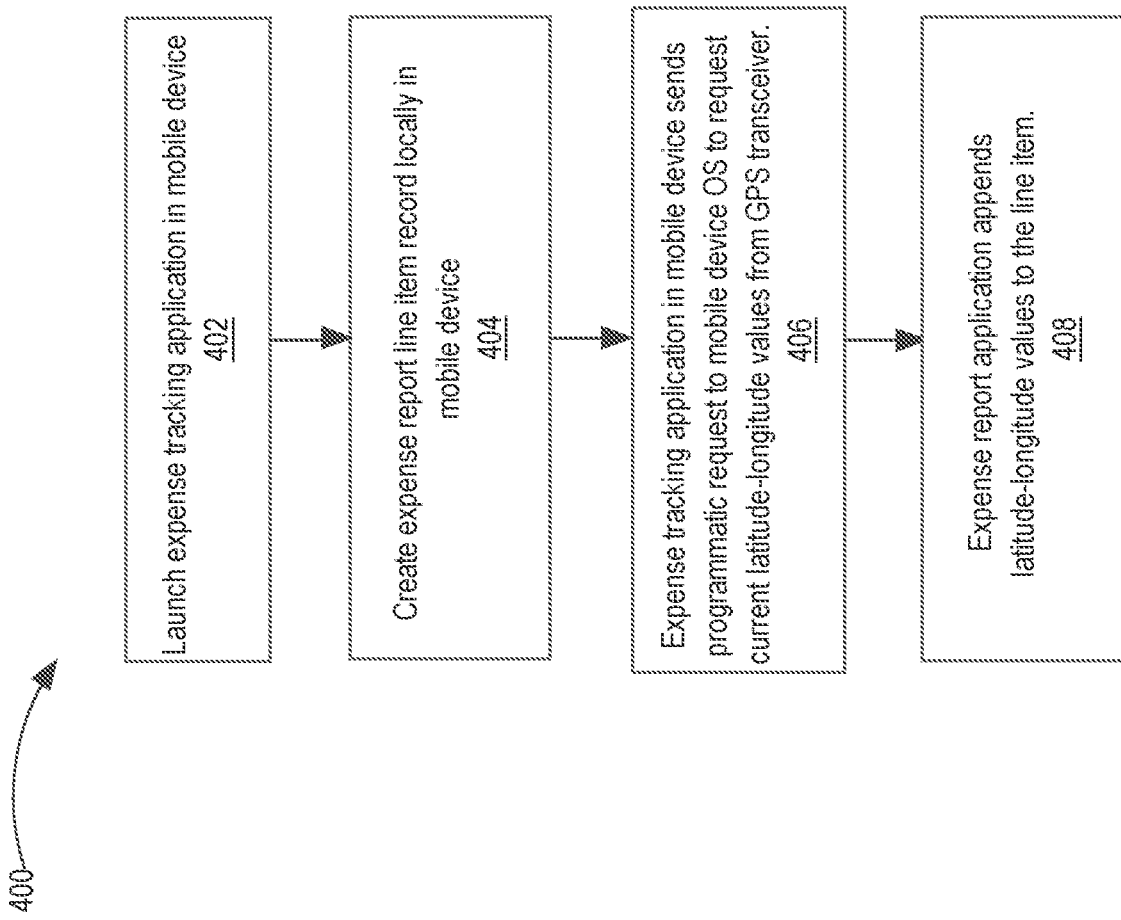
FIG. 4 illustrates an example algorithm or method of generating expense report line items by a mobile computing device, according to various embodiments.

Referring now to FIG. 4, in step 402, an expense tracking application is launched on a mobile computing device. For example, expense tracking application 112 on the mobile computing device 102 is launched by user interaction with an app icon or other facility of the mobile computing device that provides access to applications and a means to start them. The expense tracking application 112 may be launched manually by the user or in response to a notification or alert sent by the application server 104 and received by the mobile computing device 102. Suitable techniques for generating and displaying alerts and notifications are described, for instance, in U.S. application Ser. No. 15/16, 954, filed May 20, 2016, the entire contents of which are hereby incorporated by reference for all purposes as if fully set forth herein.

In step 404, an expense report line item record is created locally in the mobile computing device. For example, an expense report line item record 126, 128 is created locally in the mobile computing device 102. The expense report line item may be created via the expense tracking application 112 in response to input from a user using a touchscreen, keyboard, or from a digital data source via the I/O interface 114. Or, triggering creation of an expense report line item can be suggested automatically by the expense tracking application 112. In an embodiment, expense report line item data fields like those shown in FIG. 2 may be automatically populated by the expense tracking application 112 with the corresponding data values or manually entered. A user may also edit the data fields of the expense report line item 200 after they are auto-populated by the expense tracking application 112. The specific manner of creating a record 126, 128 is not critical.

In step 406, the expense tracking system obtains digital location values corresponding to a location of the mobile computing device. For example, the expense tracking application 112 sends a programmatic request to the operating system 110 of the mobile computing device 102 to obtain current latitude-longitude values from the GPS transceiver and corresponding to a then-current physical location of the mobile computing device. As detailed above with respect to FIG. 1, the operating system 110 may include components that include one or more methods for determining location of the mobile computing device 102 at any given time. Some examples of these methods include using triangulation using cellular radiotelephone tower information, receiving coordinates from a global positioning system (GPS) antenna, detecting a Bluetooth beacon, detecting a Near Field Communication tag, or any combination of the foregoing. The computer network system 100 may not need to access the underlying hardware of the mobile computing device 102 to retrieve this information. For example, the computer network system 100 may implement various features provided in an API of an operating system executing on the mobile computing device 102 to retrieve the location information.

In step 408, the location values are associated with the line item that was created in step 404. For example, the expense tracking application 112 appends the latitude-longitude values received from the operating system 110 in step 406 to the corresponding data fields of the expense report line item. As a result, an expense report line item 126, 128 contains at least some data about an expense report item in association with location information indicating where the mobile computing device was located when the expense report item was created.

Returning to FIG. 3, in step 304 an expense report line item is transmitted to an application server computer. For example, the mobile computing device 102 transmits the expense report line item(s) 126, 128 to the application server 104 via the network 108. In step 306, the expense report line item is stored in a database. For example, the application server 104 receives the expense report line item(s) 126, 128 and stores the records in the expense report line item table 124 inside the database 122.

In step 308, the process receives a request for information from an administrator computer. For example, the application server 104 receives a request for information from the administrator computer 106. In an embodiment, the request for information comprises a request to report all account identification values that are within a specified geographic region, as shown in step 310. In an embodiment, the specified geographic region may comprise a ZIP code, city name, geographic region, or a selection on a map. An account identification value may also be referred to as a "User ID" from the expense report line item table 200 in FIG. 2. In another embodiment, the request for information comprises a request to report the last n recorded locations of a particular account identification value.

Figure 5:
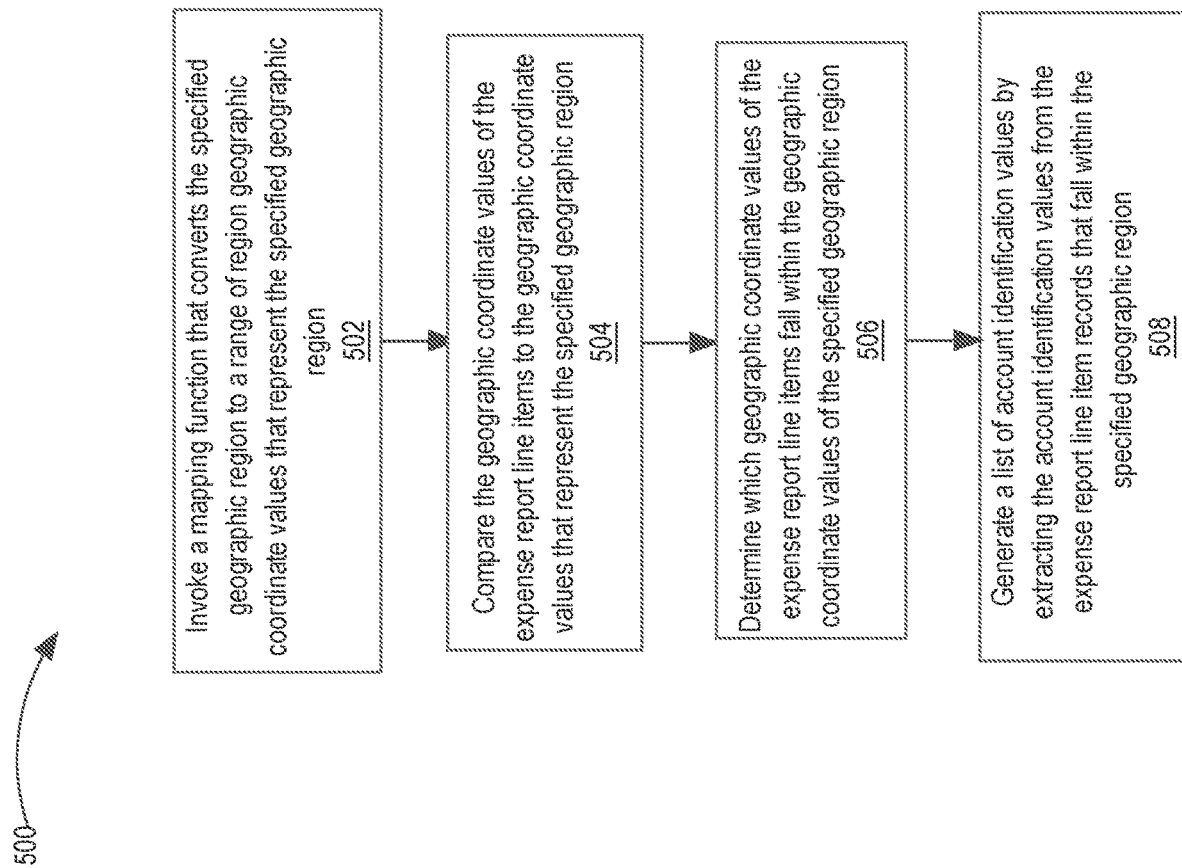
FIG. 5 illustrates an example algorithm or method of reporting all account identification values that are within a specified geographic region, according to various embodiments.

In the embodiment of step 310, for example, the application server 104 services the request issued by the administrator computer 106 to report all account identification values that are within a specified geographic region. The generation of the report is illustrated in detail by flow 500 of FIG. 5. Optionally, the process may also use timestamp values to limit the report to accounts that were within the specified geographic region in a specified time period, for example, within the past day, 12 hours, 1 hour, etc.

In step 502, flow 500 invokes a mapping function that converts the specified geographic region to a range of region geographic coordinate values that represent the specified geographic region. For example, the application server 104 invokes the location-alerting-mapping instructions 118 which in turn invoke a third party application programming interface (API) via the network 108 to convert the specified geographic region or may also do the conversion on the application server 104. For example, if the administrator specifies a city named "Johnsonville", the location-alerting-mapping instructions 118 will convert the specified city "Johnsonville" into a range of geographic coordinate values, such as [85-90]° and [0-5]°.

In step 504, the geographic coordinate values of the expense report line items are compared to the geographic coordinate values that represent the specified geographic region. For example, application server 104 reads the expense report line items from the expense report line item table 124 in the database 122 via the database interface 120. The application server 104 reads the latitude-longitude data field values from each expense report line item and compares the latitude-longitude values of each expense report line item to the converted range of geographic coordinate values obtained from the location-alerting-mapping instructions 118 in step 502. Or, a structured query is formulated at step 504 and used in conjunction with step 506 to retrieve a result set of matching records.

In step 506, it is determined which geographic coordinate values of the expense report line items fall within the geographic coordinate values of the specified geographic region. For example, the application server 104 determines which geographic coordinate values of the expense report line items fall within the converted geographic coordinate values of the specified geographic region. If the latitude-longitude values from an expense report line item fall within the converted range of geographic coordinate values, it is determined that the particular expense report line item is within the specified geographic region.

In step 508, the process generates a list of account identification values based on the matching expense report line items that were retrieved. For example, the application server 104 generates a list of account identification values, also referred to as "User IDs" in FIG. 2, by extracting the account identification values from the expense report line item records that are within the specified geographic region as determined in step 506. As a result, the process 500 has yielded a list or set of account identifiers for all accounts, users or devices that were within the specified geographic region at a particular time.

Figure 6:
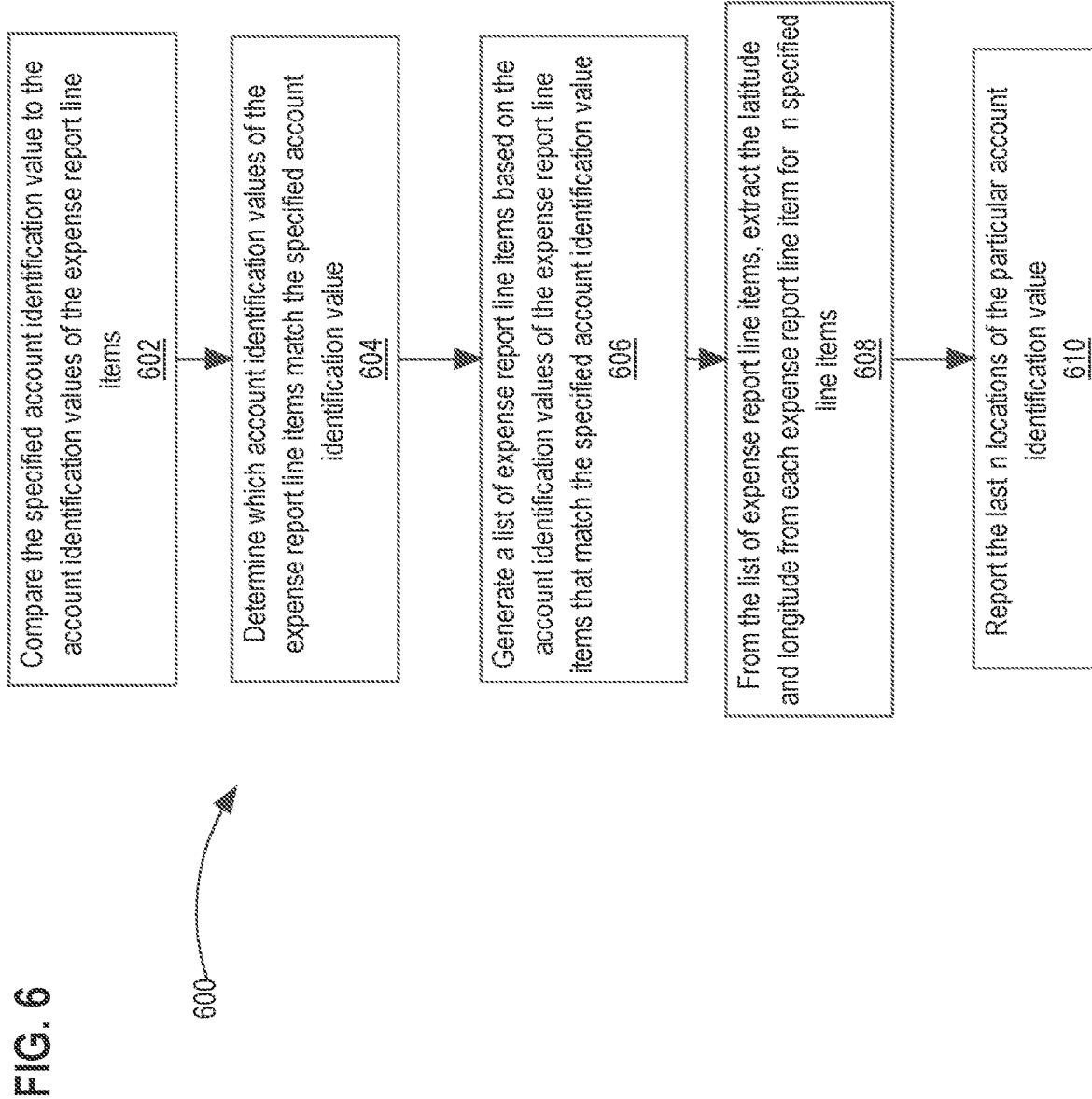
FIG. 6 illustrates an example algorithm or method of reporting the last n recorded locations of a particular account identification value, according to various embodiments.

In another embodiment shown by step 312, the application server 104 services the request issued by the administrator computer 106 to report the last n recorded locations of a particular account identification value. The generation of the report is illustrated in detail by flow 600 of FIG. 6.

In step 602, the specified account identification value is compared to the account identification values of the expense report line items. For example, the application server 104 compares the specified particular account identification value to the account identification values of the expense report line items that are stored in the expense report line item table 124 in the database 122.

In step 604, it is determined which account identification values of the expense report line items match the specified account identification value. For example, the application server 104 determines which account identification values of the expense report line items match the specified particular account identification value.

In step 606, a list is generated of expense report line items based on the account identification values of the expense report line items that match the specified account identification value. For example, the application server 104 generates a list of expense report line items that match based on the determination made in step 604.

In step 608, the latitude and longitude from each expense report line item for n specified line items is extracted. For example, the application server 104 extracts the latitude and longitude data field values from the list of expense report line items generated by step 606. For a particular account identification value specified by the administrator computer 106, a number n of latitude and longitude data field values are extracted from the list of expense report line items. If the list of expense report line items includes a greater number of recorded locations associated with a particular account identification than the specified number n of recorded locations, the most recent recorded locations associated with a particular account identification will be extracted. If the list of expense report line items includes a lesser number of recorded locations associated with a particular account identification than the specified number n of recorded locations, all recorded locations associated with a particular account identification will be extracted.

In step 610, the last n locations of the particular account identification value are reported. For example, the application server 104 reports the last n locations of the particular account identification value based on the extracted latitude and longitude data field fields from step 608. In an embodiment, the report of the last n locations of a particular account identification value may include the latitude and longitude associated with the date the geographic coordinates were recorded. The application server 104 may send the report via the network 108 to the administrator computer 106.

Returning to FIG. 3, in step 314 the process generates an alert that prompts users or devices within the specified geographic region for other information. For example, the application server 104 generates alerts or notifications via the presentation layer 116 that are sent via the network 108 to the mobile computing device 102. In an embodiment, the administrator computer 106 may communicate with the application server 104 via the network 108 to specify the type and content of additional information that is sent via alert or notification to the mobile computing devices 102. Based on the report generated by step 310 and sub-steps 502-508, the alerts or notifications are sent to the mobile computing devices 102 that are associated with the generated list of account identification values that are determined to be within the specified geographic region. The alerts or notifications may prompt the users via the expense tracking application 112 to enter additional information. For example, the request for additional information may include a message or prompt to "Check in Safe" or "Need Help?". In some embodiments, a user may provide the additional information that is requested by providing input via the I/O interface 114. In an embodiment, the expense tracking application 112 will repeatedly prompt a user to enter additional information until some amount of information has been provided. The additional information provided by a user is transmitted from the mobile computing device 102 via the network 108 to the application server 104.

In an embodiment, an alert that prompts users or devices for additional information may be generated based on a user's associated office address and/or home address. For example, if the home address or office address associated with a user identification is determined to be within the specified geographic region, that specific user may receive an alert prompting that user for additional information even if none of that user's expense report line item records include geographic coordinates recorded inside the specified geographic area.

In step 316, based on the additional information that is received, a report is generated specifying which users provided additional information. In an embodiment, the report may specify which users provided additional information and the content of the additional information that they provided. For example, if an alert or notification is sent to a user prompting the user to "Check In Safe", and the user provides additional information that indicates that they are safe, the report will specify which users have checked in safe and which users are currently outstanding.

4.0 Benefits

Using these approaches, based upon expense report records that mobile computing devices create in the ordinary course of business using an expense recording application, it is possible to accumulate data records that indicate locations of mobile computing devices at the time that the records were created, and to use those records for unrelated reporting purposes, such as reporting all users, accounts or devices that are currently within a specified geographic region, or to report the last N locations of a particular account, user or mobile computing device. Consequently, with these techniques it is possible for an entity, such as a business organization, to obtain accurate recent location data for mobile computing devices of employees or other personnel. Rather than guessing about the location of users, employees or their devices, accurate past location data is automatically recorded without significant user impact since the location values are obtained as part of expense report data records that are needed for another purpose. These techniques are based upon the creative conception and recognition of the inventors, in an inventive moment, that data collected using a remote data collection and reporting application such as an expense reporting application can be used for a purpose not contemplated by the expense reporting application and completely unrelated to the expense reporting application. Furthermore, because the data collected and reported using that application happens to include geo-location data and be associated with user account identifying data, it is possible to use the collected and reported data for an entirely new purpose with server computer logic without any modification of the expense reporting application.

These techniques promote efficiency in the use of data processing resources and a reduction in use of resources. For example, an entity is not required to deploy a separate computer program application just for the purpose of personnel tracking. Further, a user or mobile computing device is not required to actively launch a particular application program for the purpose of recording user, account or device location; instead, obtaining location data occurs naturally and automatically as users record expense line items for the purpose of later reimbursement and for the purpose of accurate reporting of expenses. The location data is used, in the techniques herein, in an alternative manner to the main purpose of the expense reporting application. Fewer network messages are needed and less memory is needed to buffer special-purpose messages that otherwise would be required to contact personnel in the field to identify their location. Counts of employees, other users, devices or accounts within a specified geographic area can be obtained immediately based upon expense report data entered in the past.

Additionally, these techniques promote efficiency in the overall functioning of business operations. In the event of an emergency, businesses are legally obligated to keep track of their employees who are traveling on business. The location data of travelers is conventionally retrieved by directly requesting location data from the traveler or by explicitly monitoring the location of an employee via phone application or pre-set travel plans. Various businesses employ teams of employees to manually contact business travelers in the case of a security event in order to meet their legal obligations. As a necessity to meet regulations, such a labor-intensive operation can result in extensive spending being dedicated to the specific scenario where businesses are required to keep track and check in with their employees. Instead of hiring a team to keep track of traveling employees, the current improvement of using the data from the expense report line items to automatically check in with business travelers who have been identified as traveling in a specific region allows a business to operate with improved efficiency. By prompting business travelers to record expenses and recording the locations of each expense, a geo-footprint of a business traveler's recent whereabouts can be obtained. Using the expense report line items as a non-routine data source, the recorded geographic coordinates of a business traveler's expenses can be compared to specified geographic regions, which can be represented by ranges of geographic coordinates. If the comparison shows that an expense was recorded within a specified geographic region, the respective travelers can be notified or alerted about potential security events in their current or recent area. By using the already recorded data in the automated fashion that is discussed within this disclosure, less resources can be devoted by a business to manually issue and track health and safety checks, and thus, business resources can be conserved and re-allocated to improve the overall efficiency of a business.

5.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
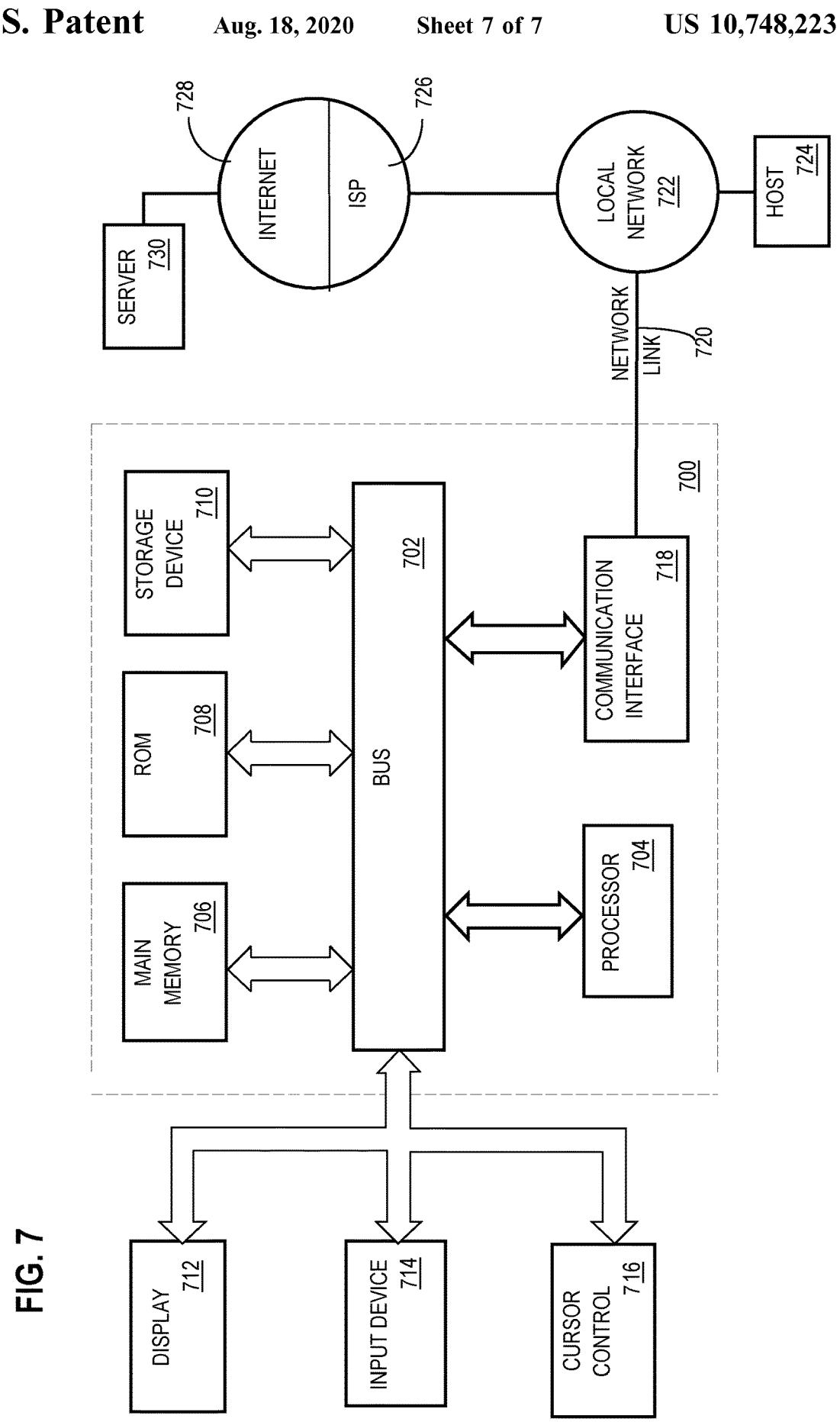
FIG. 7 illustrates a computer system upon which an embodiment of the invention may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

6.0 Other Aspects of Disclosure

Although some of the figures described in the foregoing specification include flow diagrams with steps that are shown in an order, the steps may be performed in any order, and are not limited to the order shown in those flowcharts. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure, in combination with the related text herein, is a guide, plan or specification of all or part of an algorithm for programming a computer to execute the functions that are described. The level of skill in the field associated with this disclosure is known to be high, and therefore the flow diagrams and related text in this disclosure have been prepared to convey information at a level of sufficiency and detail that is normally expected in the field when skilled persons communicate among themselves with respect to programs, algorithms and their implementation.

In the foregoing specification, the example embodiment(s) of the present invention have been described with reference to numerous specific details. However, the details may vary from implementation to implementation according to the requirements of the particular implement at hand. The example embodiment(s) are, accordingly, to be regarded in an illustrative rather than a restrictive sense.

What is claimed is:

1. A data processing method comprising:
   collecting, from a plurality of different mobile computing devices that are located in different distributed geographic locations, a plurality of different expense report line item records, the plurality of different expense report line item records generated by instances of expense tracking application programs hosted at the plurality of different mobile computing devices, each of the expense report line item records of the plurality of different expense report line item records comprising at least an account identification value and a geo-location value, the geo-location value indicating a then-current geographical location of a particular mobile computing device of the plurality of different mobile computing devices;
   digitally storing the plurality of different expense report line item records in a digital data repository;
   receiving, from a client computer, a request to report one or more of: all account identification values that are within a specified geographic region; or last recorded locations of a particular account identification value;
   generating and submitting a database query to the digital data repository based on the request, and receiving a result set of particular account identification values or particular last recorded location values;
   generating and causing displaying, at the client computer, a digital data display that shows the particular account identification values or particular last recorded location values;
   causing prompting each mobile computing device of the plurality of different mobile computing devices that is associated with each particular account identification value in the result set to enter additional information;
   collecting additional information from at least one mobile computing device of the plurality of different mobile computing devices that is associated with the account identification values in the result set;
   generating, based on receiving the additional information, a report specifying which account identification values in the result set did or did not provide additional information.

2. The method of claim 1 wherein the digital data display comprises a graphical geographic map comprising a plurality of graphical map pin icons, each of the graphical map pin icons corresponding to a particular geo-location value of a particular expense report line item record of the plurality of different expense report line item records corresponding to one of the particular account identification values.

3. The method of claim 1 wherein the digital data display comprises a graphical geographic map comprising a plurality of graphical map pin icons, each of the graphical map pin icons corresponding to a particular geo-location value of a particular expense report line item record of the plurality of different expense report line item records corresponding to one of the particular last recorded location values.

4. The method of claim 1, wherein the request is to report the last recorded locations of a particular account identification value, the method further comprising:
   determining the last recorded locations of the particular account identification value by comparing the particular account identification value to the account identification value of each expense report line item record of the plurality of different expense report line item records;
   generating a result set of particular last recorded location values based on the account identification values of the expense report line item records of the plurality of different expense report line item records that match the particular account identification value.

5. The method of claim 1, wherein the request is to report all account identification values that are within a specified geographic region, the method further comprising invoking a mapping function to convert the specified geographic region into one or more ranges of region coordinate values that are within the specified geographic region, and using the one or more ranges in the database query.

6. The method of claim 5, further comprising executing the database query, wherein executing the database query comprises determining which geo-location values of each expense report line item record of the plurality of different expense report line item records fall within the one or more ranges of region coordinate values by comparing the one or more ranges of region coordinate values that are within the specified geographic region to the geo-location values of each expense report line item record of the plurality of different expense report line item records.

7. The method of claim 6, further comprising generating a result set of particular account identification values by extracting the account identification values from each expense report line item record of the plurality of different expense report line item records that falls within the one or more ranges of region coordinate values.

8. The method of claim 1, further comprising repeatedly prompting each mobile computing device that is associated with a particular account identification value in the report to enter additional information until each respective mobile device provides additional information.

9. The method of claim 1, wherein each account identification value is associated with an office address and home address, the method further comprising:
  generating, based on the result set of particular account identification values and associated office address and home address, an alert on the mobile computing devices that correspond to the particular account identification values of the result set.

10. The method of claim 1, wherein the specified geographic region comprises a ZIP code, city name, or a selection on a map.

11. A data processing system comprising:
  one or more hardware processors;
  a non-transitory computer-readable medium having instructions embodied thereon, the instructions, when executed by the one or more processors, cause:
  collecting, from a plurality of different mobile computing devices that are located in different distributed geographic locations, a plurality of different expense report line item records, the plurality of different expense report line item records generated by instances of expense tracking application programs hosted at the plurality of different mobile computing devices, each of the expense report line item records of the plurality of different expense report line item records comprising at least an account identification value and a geo-location value, the geo-location value indicating a then-current geographical location of a particular mobile computing device of the plurality of different mobile computing devices;
  digitally storing the plurality of different expense report line item records in a digital data repository;
  receiving, from a client computer, a request to report one or more of: all account identification values that are within a specified geographic region; or last recorded locations of a particular account identification value;
  generating and submitting a database query to the digital data repository based on the request, and receiving a result set of particular account identification values or particular last recorded location values;
  generating and causing displaying, at the client computer, a digital data display that shows the particular account identification values or particular last recorded location values;
  causing prompting each mobile computing device of the plurality of different mobile computing devices that is associated with each particular account identification value in the result set to enter additional information;
  collecting additional information from at least one mobile computing device of the plurality of different mobile computing devices that is associated with the account identification values in the result set;
  generating, based on receiving the additional information, a report specifying which account identification values in the result set did or did not provide additional information.

12. The system of claim 11, wherein the digital data display comprises a graphical geographic map comprising a plurality of graphical map pin icons, each of the graphical map pin icons corresponding to a particular geo-location value of a particular expense report line item record of the plurality of different expense report line item records corresponding to one of the particular account identification values.

13. The system of claim 11, wherein the digital data display comprises a graphical geographic map comprising a plurality of graphical map pin icons, each of the graphical map pin icons corresponding to a particular geo-location value of a particular expense report line item record of the plurality of different expense report line item records corresponding to one of the particular last recorded location values.

14. The system of claim 11, wherein the request is to report the last recorded locations of a particular account identification value, further comprising instructions executed by the system which, when executed, cause:
  determining the last recorded locations of the particular account identification value by comparing the particular account identification value to the account identification value of each expense report line item record of the plurality of different expense report line item records;
  generating a result set of particular last recorded location values based on the account identification values of the expense report line item records of the plurality of different expense report line item records that match the particular account identification value.

15. The system of claim 11, wherein the request is to report all account identification values that are within a specified geographic region, further comprising instructions executed by the system which, when executed cause:
  invoking a mapping function to convert the specified geographic region into one or more ranges of region coordinate values that are within the specified geographic region, and using the one or more ranges in the database query.

16. The system of claim 15, further comprising instructions executed by the system which, when executed, cause: executing the database query, wherein executing the database query comprises determining which geo-location values of each expense report line item record of the plurality of different expense report line item records that fall within the one or more ranges of region coordinate values by comparing the one or more ranges of region coordinate values that are within the specified geographic region to the geo-location values of each expense report line item record of the plurality of different expense report line item records.

17. The system of claim 16, further comprising instructions executed by the system which, when executed, cause: generating a result set of particular account identification values by extracting the account identification values from each expense report line item record of the plurality of different expense report line item records that falls within the one or more ranges of region coordinate values.

18. The system of claim 11, further comprising instructions executed by the system which, when executed, cause: repeatedly prompting each mobile computing device that is associated with a particular account identification value in the report to enter additional information until each respective mobile computing device provides additional information.

19. The system of claim 11, wherein each account identification value is associated with an office address and home address; further comprising instructions executed by the system which, when executed, cause:
   generating, based on the result set of particular account identification values and associated office address and home address, an alert on the mobile computing devices that correspond to the particular account identification values of the result set.

20. The system of claim 11, wherein the specified geographic region comprises a ZIP code, city name, or a selection on a map.

* * * * *